(12) United States Patent
Whitfield, Jr. et al.

(10) Patent No.: US 7,604,300 B2
(45) Date of Patent: Oct. 20, 2009

(54) DUMP TRUCK

(75) Inventors: James Arthur Whitfield, Jr., Chesapeake, VA (US); Michael Kelly Yates, Hampton, VA (US)

(73) Assignee: Liebherr Mining Equipment Co., Newport News, VA (US)

( * ) Notice: Subject to any disclaimer, the term of this patent is extended or adjusted under 35 U.S.C. 154(b) by 0 days.

(21) Appl. No.: 12/082,490

(22) Filed: Apr. 11, 2008

(65) Prior Publication Data

US 2008/0303336 A1    Dec. 11, 2008

(30) Foreign Application Priority Data

Apr. 11, 2007    (DE) .................... 20 2007 005 232 U

(51) Int. Cl.
*B60P 1/16*    (2006.01)
(52) U.S. Cl. .................................... 298/22 C; 298/22 P
(58) Field of Classification Search ............... 298/22 C, 298/22 R, 22 P, 19 R; 254/93 VA, 89 H, 254/423
See application file for complete search history.

(56) References Cited

U.S. PATENT DOCUMENTS 7,182,406 B2 *    2/2007    Ahlberg .................... 298/19 B

FOREIGN PATENT DOCUMENTS

| DE | 2364282 | 7/1975 |
|---|---|---|
| DE | 3220303 | 2/1983 |
| DE | 3508339 | 9/1986 |
| DE | 4243578 | 6/1994 |
| DE | 19603899 | 8/1997 |
| DE | 69220032 | 9/1997 |
| DE | 19753915 | 6/1998 |
| DE | 19961801 | 6/2000 |
| DE | 20115303 | 4/2002 |
| DE | 20201957 | 6/2003 |
| EP | 1359032 | 11/2003 |
| WO | 92/04196 | 3/1992 |

* cited by examiner

*Primary Examiner*—Stephen Gordon
(74) *Attorney, Agent, or Firm*—Dilworth & Barrese LLP

(57) ABSTRACT

The present invention relates to a dump truck or large mining truck, comprising a dump body for the transport of overburden or the like, a first hydraulic circuit having a first pump device for the actuation of the dump body as well as a second hydraulic circuit having a second pump device for the actuation of a steering and/or of a braking device of the dumper truck chassis and/or an auxiliary truck element. In accordance with the invention, the first, second and/or a further hydraulic circuit having are connected to one another by a valve device which is controlled by a control device such that the plurality of hydraulic circuits cooperate in an unloading mode and actuate the dump body together and, on the other hand, the hydraulic circuits work separately in a travel mode so that the second hydraulic circuit and/or any further hydraulic circuit is separated from the dump body and its actuator device. The performance of the pump devices are added so-to-say by the combination of the hydraulic circuits, whereby a fast unloading of the dump body can be achieved despite the huge load. On the other hand, the valve device can uncouple the hydraulic circuits from one another, whereby the second hydraulic circuit can be utilized specifically only for the steering and/or the braking device in the travel mode.

20 Claims, 3 Drawing Sheets

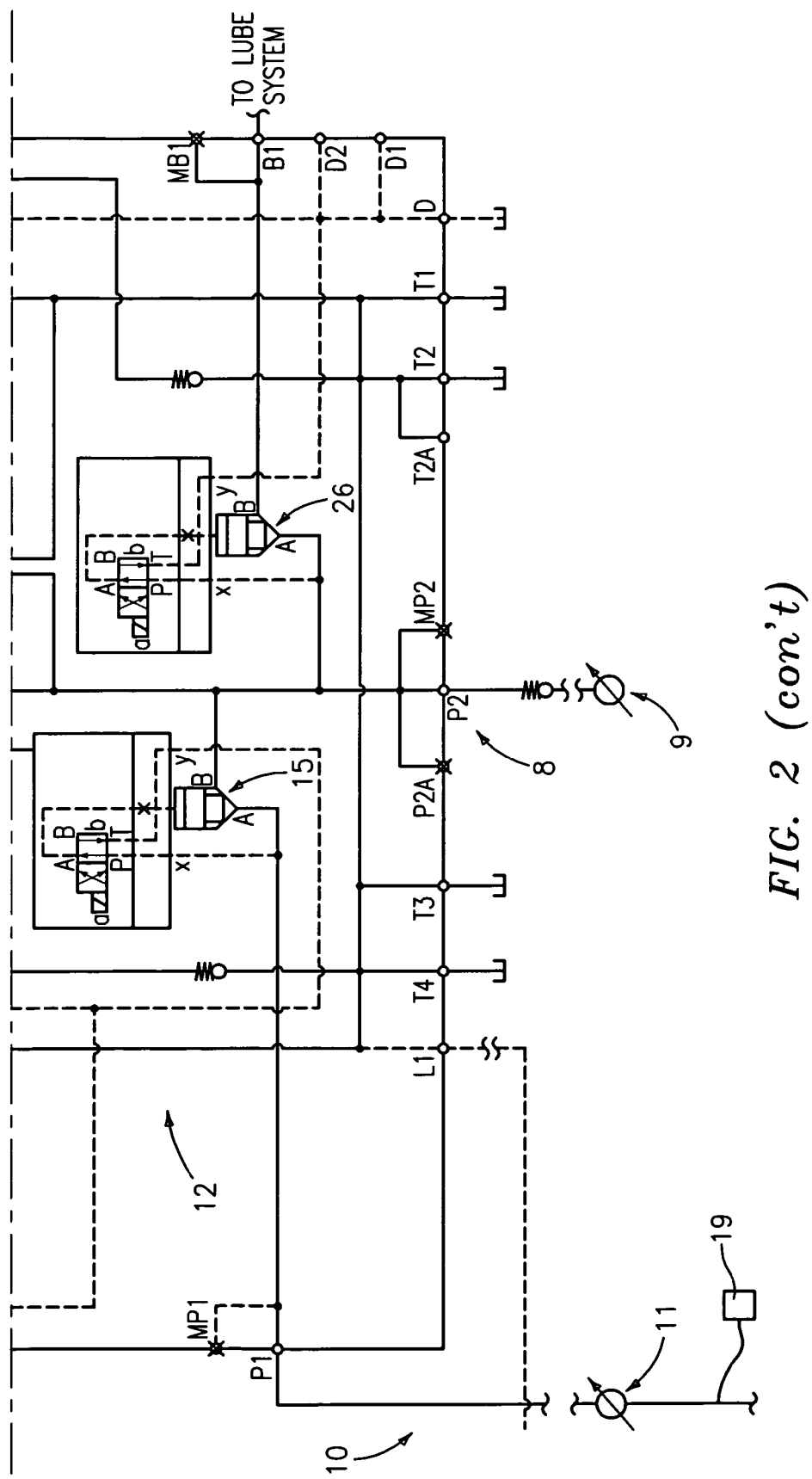
FIG. 2 (con't)

DUMP TRUCK

BACKGROUND OF THE INVENTION

The present invention relates to a dump truck, in particular to a so-called large mining truck, comprising a dump body for the transport of overburden or the like, a first hydraulic circuit having a first pump device for the actuation of the dump body as well as a second hydraulic circuit having a second pump device for the actuation of a steering and/or of a braking device of the dumper truck chassis and/or an auxiliary truck element.

Such a large mining truck or large dump truck is described, for example, in EP 1 359 032. Such large dump trucks are predominantly used in mining operations for the transport of the mined minerals and ores, with the bulk material dump trucks being manufactured in a size of several 100 metric tons unladen weight and working load. WO 92/04196 also shows such a large dump truck.

As a rule, in such large dump trucks, hydraulic circuits are used for the actuation of the steering, the brakes, the dump body as well as further auxiliary functions. These different functions are typically divided among a plurality of hydraulic systems or hydraulic circuits independent of one another. A hydraulic circuit can be provided, for example, for braking and steering, whereas a further hydraulic circuit is provided for the raising of the dump body. To ensure an efficient operation of the dump truck, it is understood that the unloading of the material received in the dump body should also be taken care of as fast as possible. However, due to the huge load capacity of such large dump trucks, a fast actuation of the dump body requires a correspondingly largely dimensioned hydraulic circuit with a correspondingly high-performance pump device. Such large hydraulic systems are, however, disadvantageous with respect to their weight and the costs. If, in contrast, hydraulic systems of smaller dimensions are used for the actuation of the dump body, the weight and costs can admittedly be reduced, but disadvantages arise with respect to a time-efficient actuation of the dump body.

SUMMARY OF THE INVENTION

Starting from this, it is the underlying object of the present invention to provide an improved dump truck of the named type which avoids disadvantages of the prior art and further develops the latter in an advantageous manner. A time-efficient unloading of the dump body should preferably be achieved without having to buy it at the cost of a design of the hydraulic system which is heavy in construction and intensive in cost.

This object is solved in accordance with the invention by a dump truck in accordance with the description herein. Preferred aspects of the invention are also the subject of the description herein.

It is therefore proposed not to use the hydraulic circuits of the dump truck fixedly for only one function and only to configure it therefor, but to use and operate them differently in dependence on the operating situation. By a selective combination and separate operation of the plurality of hydraulic circuits in dependence on the operating situation, the advantages of a plurality of separate hydraulic circuits can be maintained and simultaneously a fast actuation of the dump body can be achieved on unloading without a correspondingly large-dimensioned design of the corresponding hydraulic circuit. In accordance with the invention, the initially named first hydraulic circuit having the first pump device for the actuation of the dump body and the second hydraulic circuit having the second pump device for the actuation of the steering and/or of the brake of the dump truck chassis and/or of an accessory truck element are connected to one another by a valve device which is controlled by a control device such that, on the one hand, the two hydraulic circuits cooperate in an unloading mode and actuate the dump body together and, on the other hand, the two hydraulic circuits work separately in a travel mode so that the second hydraulic circuit is separated from the dump body and its actuator device. The performance of the two pump devices are added so-to-say by the combination of the two hydraulic circuits, whereby a fast unloading of the dump body can also be achieved despite the huge load. On the other hand, the valve device can uncouple the two hydraulic circuits from one another, whereby the second hydraulic circuit can be utilized specifically only for the steering and/or the braking device in the travel mode.

In a further development of the invention, the said first hydraulic circuit likewise does not have to be used fixedly for the actuation of the dump body; it can rather also be used for other work. The first hydraulic circuit can in particular be connected to at least one auxiliary unit in the travel mode, said auxiliary unit being separated from the first hydraulic circuit in the unloading mode, and can actuate this at least one auxiliary unit in the travel mode. In travel mode, an actuation of the dump body is only of secondary priority so that the first hydraulic circuit can also be used for other work. Various hydraulic components can be considered as the auxiliary unit in this connection, for example cooling pumps or the like.

To the extent that even further hydraulic circuits are present above and beyond the first and second hydraulic circuits, provision can be made in an advantageous further development of the invention for these further hydraulic circuits also to be used in the unloading mode to actuate the dump body. In response to different operating conditions of truck, the control differently actuates the valve device to selectively combine the available pump devices for one operating task and separate the pump devices for separately provide pressure for different operating tasks. Provision can in particular be made for all hydraulic circuits to be connected together by the aforesaid valve device in the unloading mode such that they contribute to the actuation of the dump body. The use of all hydraulic circuits for the actuation of the dump body in the unloading mode is, however, not absolutely necessary. It can optionally also be sufficient to connect the larger hydraulic circuits and/or the otherwise unneeded hydraulic circuits. To achieve a particularly efficient actuation of the dump body, however, the connecting together of all hydraulic circuits and of the pump devices provided therein is advantageous for the unloading of the dump body.

The valve device, with whose help the hydraulic circuits can be selectively operated separately or connected together, can generally have different designs. In accordance with a preferred embodiment of the invention, the valve device includes at least one switching valve and at least one flow control valve, with the aforesaid second hydraulic circuit preferably being able to be connected to the first hydraulic circuit via a switching valve upstream of the flow control valve so that the second hydraulic circuit can be connected to the first hydraulic circuit upstream of the flow control valve by opening the said switching valve so that, in the unloading mode, both the pressure fluid from the first pump device and the pressure fluid from the second pump device can be controlled by only one common flow control valve.

Advantageously, a further switching valve is provided parallel to the named flow control valve in the hydraulic circuit so that the hydraulic flow acting on the actuator device of the dump body can be controlled both by means of the flow control valve and by means of the further switching valve. This can in particular be utilized for a sequential control of the said flow control and switching valves and the hydraulic flow amount controlled thereby, in particular to the effect that, on a desired slow positional movement of the dump body, the hydraulic flow is controlled via the flow control valve and, on a desired fast positional movement of the dump body, the flow control valve and its flow resistance is bypassed by enabling the switching valves provided in parallel. Small hydraulic volumes can thereby be controlled precisely by the flow control valve, whereas, on the other hand, large positional speeds are made possible via the additional switching valve.

In an advantageous further development of the invention, the hydraulic flows can also be controlled by adjustment of the pump devices themselves. Preferably, at least one of the pump devices, advantageously every pump device, has a variable delivery pump with adjustable pump flow which is controlled by the aforesaid control device to correspondingly regulate the pump flow.

In connection with the aforesaid switch and flow control valves, the adjustment path of the dump body can thereby be finely controlled by a combination of valve actuation and variable delivery pump actuation and a desired speed profile can be generated.

The pump devices of the hydraulic circuits can be made in the form of separate pumps, preferably variable delivery pumps. Alternatively, the pump devices can also be formed by a dual pump or a multi-pump in which a common drive drives a plurality of pump units or pump means for the generation of a plurality of volume flows.

In order not to endanger the travel and operating safety of the dump truck by the previously explained connecting together of the hydraulic circuits, priority is given to the operation of the steering and of the brakes in a further development of the invention. For this purpose, in a further development of the invention, the control device includes a safety switch or safety component which, on the detection of operating parameters relevant to safety, suppresses the connecting together of the hydraulic circuits and/or also disconnects the aforesaid second hydraulic circuit from the dump body and its actuator device in the unloading mode. In other words, the second pump device is again put to its actual purpose, namely the supply of the steering and/or the braking device when the circumstances require, and indeed irrespective of whether the dump body is just being unloaded or not.

The circumstances relevant to safety can generally be ascertained, determined or detected in different manners. In accordance with an advantageous embodiment of the invention, the aforesaid safety switch or safety component can be connected to pressure detection means which report a critical fall in a steering pressure and/or braking pressure so that in this case the second pump device of the second hydraulic circuit is again used solely for the provision of the steering pressure and/or braking pressure.

Alternatively or additionally, a pressure store can be associated with the second hydraulic circuit by means of which pressure store the steering and/or the braking device can be pressurized in the unloading mode despite the connection of the second pump device to the dump body or to its actuator device. Once the unloading process has been completed and the second pump device has again been disconnected from the actuator of the dump body, the pressure store can optionally, where necessary, be recharged again by the second pump device.

BRIEF DESCRIPTION OF THE DRAWINGS

The present invention will be explained in more detail in the following with reference to a preferred embodiment and to associated drawings. There are shown in the drawings.

DESCRIPTION OF THE PREFERRED EMBODIMENTS

Figure 1:
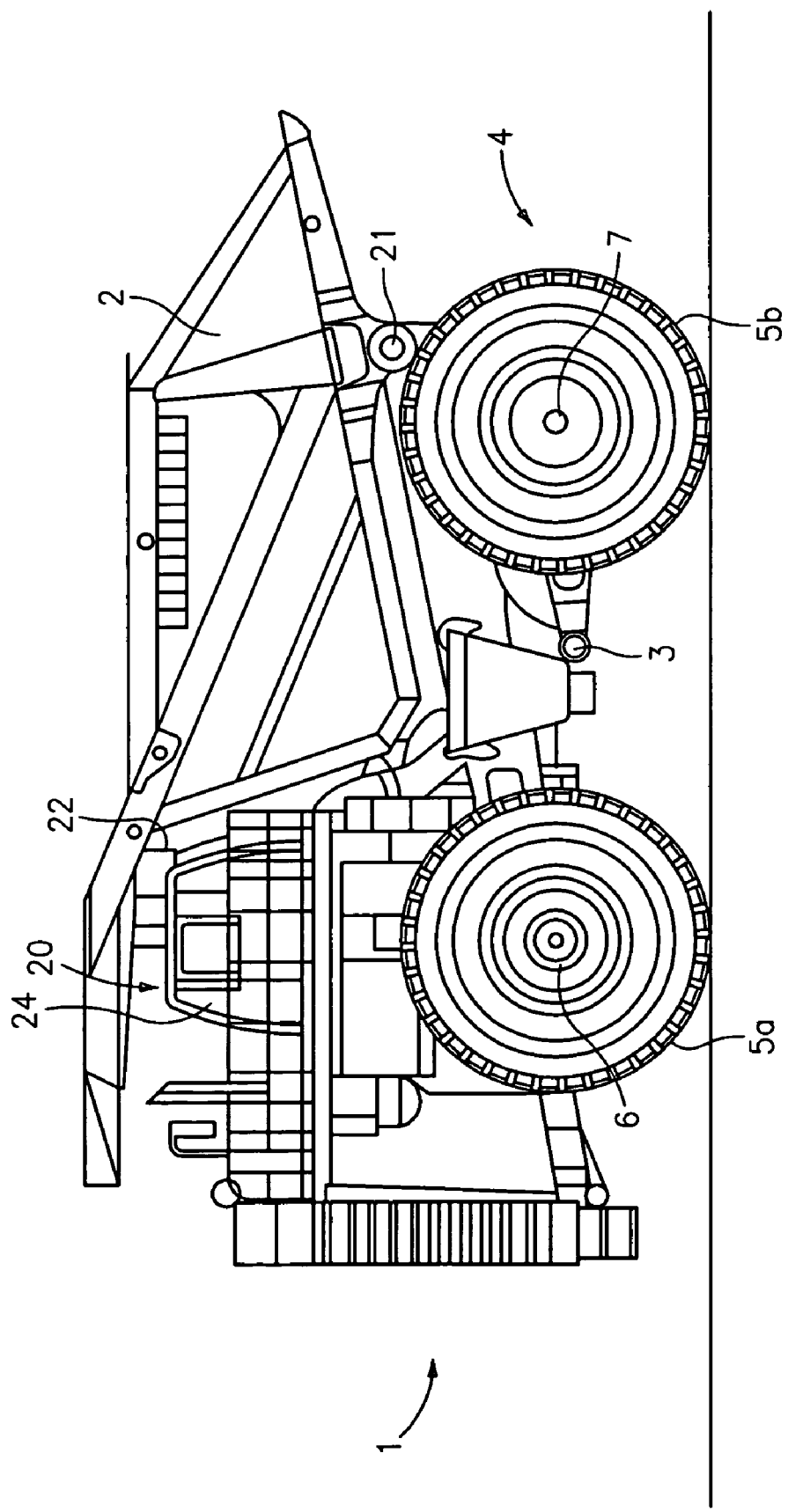
FIG. 1: a schematic side view of a large dump truck in accordance with an advantageous embodiment of the invention.

The large dump truck 1 shown in the drawing includes a dump body 2 which is supported on a frame 3 which is supported on the ground via a chassis 4. As FIG. 1 shows, an operator's compartment 20 is seated on the frame 3 in a manner known per se and extends above the front wheels 5*a* of the chassis 4. More than two rear wheels 5*b*, for example four rear wheels 5*b*, are provided at the rear axle of the chassis 4 which are advantageously driven separately by individual wheel drives. The large dump truck can typically have a length of over ten meters and a wheel diameter of over three meters and can receive bulk material loads in the range of several 100 metric tons.

The wheels 5 can be braked by a braking device 7 which may be a hydraulic braking device working hydraulically or assisted hydraulically. It is nevertheless within the scope of the invention that, in the alternative to or in addition to hydraulic brakes, the truck 1 is provided with other types of brakes, in particular an electric braking device such as an electric retarder, a dry brake, a wet brake or a combination of any of such brakes.

The truck 1 is steered by a steering 6 which, in one embodiment of the invention, likewise works hydraulically and/or is assisted hydraulically. For this purpose, a hydraulic circuit 10 is provided which is termed a second hydraulic circuit in the following and has a second pump device 11, cf. FIG. 2.

The dump body 2 can likewise be actuated hydraulically. It is tiltably supported on the frame 3 around a lying transverse axis 21 in the region of the rear end of the frame 3 and is pivotable by an actuator device 14 in the form of two hydraulic cylinders 22, 23. The hydraulic cylinders 22 and 23 are advantageously supported in the region of the front wheels 5*a* in the drawn embodiment on the frame 3 and on a front upper edge of the dump body.

Figure 2:
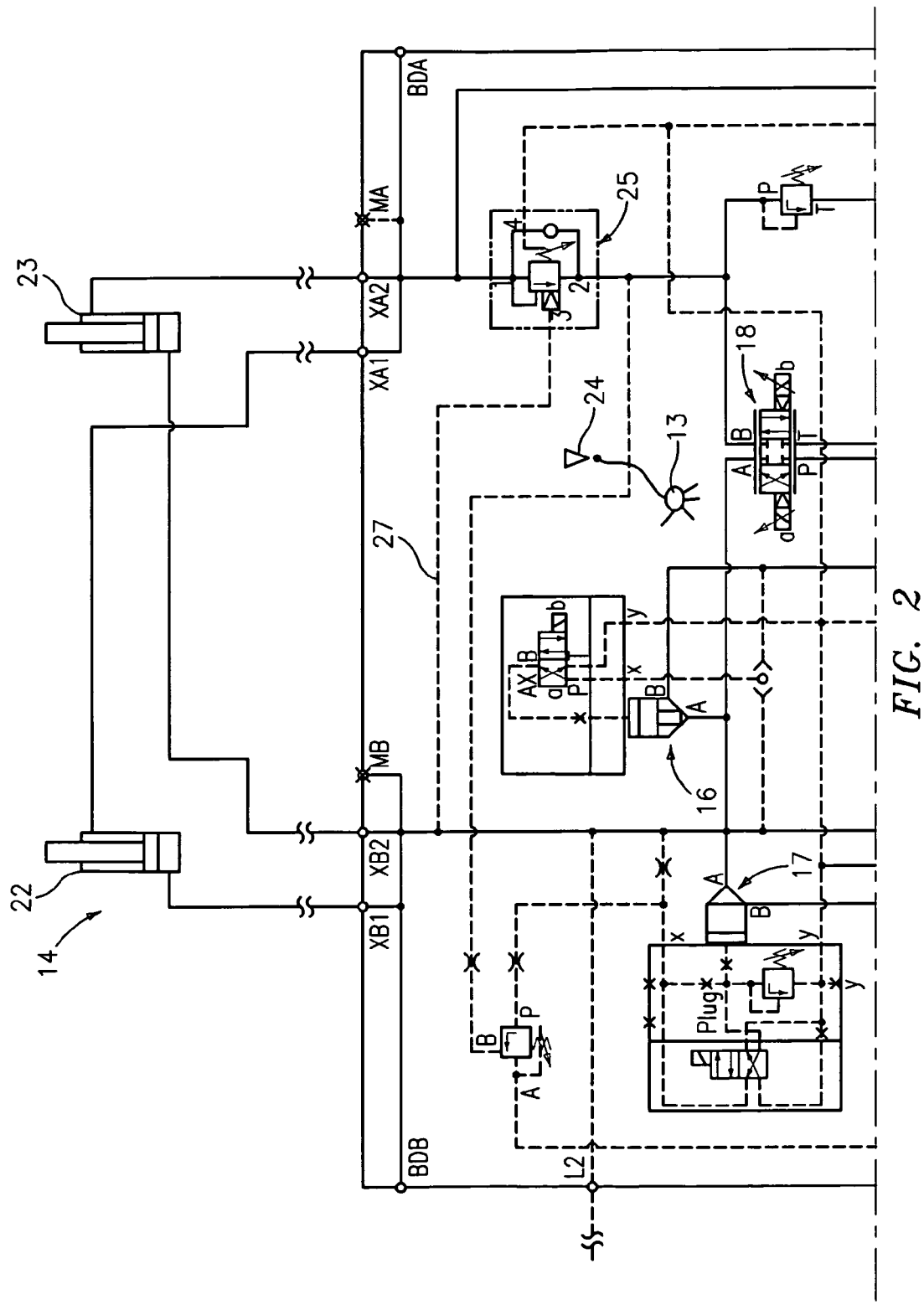
FIG. 2: a schematic representation of the hydraulic circuits for the actuation of the hydraulic actuators of the large dump truck of FIG. 1.

The said hydraulic cylinders 22 and 23 form a part of a first hydraulic circuit 8 with which a first pump device 9 is associated, cf. FIG. 2.

The two pump devices 9 and 11 advantageously each include variable delivery pumps which can be controlled with respect to their pump flow.

As FIG. 2 shows, the two hydraulic circuits 8 and 10 can selectively be operated separately or can be connected together by a valve device 12. The valve device 12 includes a switching valve 15 via which the second pump device 11 can be connected together with the pressure line of the first pump device 9, with this switching valve 15 being provided upstream of a flow control valve 18 via which the volume flow supplied to the hydraulic cylinders 22 and 23 can be controlled. A further switching valve 16 is connected parallel to the said flow control vale 18 and permits a bypassing of the flow control valve 18 or allows a direct connection of the two pump devices 9 and 11 to the said hydraulic cylinders 22 and 23.

The following functionality is advantageously provided:

In an unloading mode, the two hydraulic cylinders 22 and 23 are moved out to raise the dump body 2 and to tip out overburden stored therein. To initiate the raising of the dump body 2, a machine operator actuates a joystick 24 of a control device 13, said joystick preferably working proportionally. During the raising of the dump body 2, pressure fluid flows from the pump devices 9 and 11 via the distributor connections P1 and P2 into the system. The switching valve 15 is opened to combine the fluid flows of the two pump devices 9 and 11. The valves 16 and 18 make parallel pressure paths available to guide the pressure fluid into the corresponding chambers of the hydraulic cylinders 22 and 23 and to move out the latter. The flow control valve 18 can be a proportional valve which provides good controllability with small volume flow. The switching valve 16 does not have to be adapted to work proportionally and can in particular be opened by the control device 13 when a high positional speed is demanded. The backflow from the chambers of the hydraulic cylinders 22 and 23 which become smaller is guided, as FIG. 2 shows, via a balance valve or counter-pressure valve 25 and then via the flow control valve 18 back into the tank of the hydraulic system. When the raised end position is approached, a proximity device, not shown, signals to the control device 13 to slow down the hoisting speed. The control device 13 controls the pump devices 9 and 11 accordingly and reduces their pumping volume. To ensure a full moving out of the hydraulic cylinders 22 and 23, the pump devices 9 and 11 move out the hydraulic cylinders 22 and 23 further with a low pump flow or a pump flow which is as low as possible. On reaching the end positions, the pump devices 9 and 11 are switched to neutral to avoid excessive cylinder pressures.

If the dump body 2 should be held in the moved out position or in partly moved out position, which can be commanded by movement of the joystick 24 into its neutral position, the valves 15, 18 and 17 are closed by the control device 13 to block the pressure fluid in the hydraulic cylinders 22 and 23 and to hereby lock the hydraulic cylinders 22 and 23. The combining valve 15 is likewise closed to uncouple the pump device 9 from the dump body actuation again and back to the action on the braking device 7 and on the steering 6.

To again lower the dump body 2, the machine operator moves the joystick 24 in the corresponding direction. Only the first pump device 9 of the first hydraulic circuit 8 can advantageously be used on the lowering. The said valve 15 remains closed so that the second pump device 11 is available for braking and steering. Up to a predetermined percentage of the lowering signal, i.e. a predetermined movement of the joystick 24, the total pressure fluid is guided out of the corresponding chamber of the hydraulic cylinders 22 and 23 through the flow control valve 18 and is controlled by it. A tactile control can thereby be achieved when a loaded dump body 2 is lowered. Typically, in contrast, an empty dump body 2 is lowered, with the machine operator as a rule selecting a lowering in this case which is as fast as possible. If a predetermined threshold which lies very high, for example 90% of the full deflection, is exceeded as a result of the control command, the valve 17 is also opened to permit a higher backflow amount into the tank of the system. The opening of the switching valve 17 substantially shortens the lowering time of the dump body 2. Provision is advantageously made in this connection for a proximity device, again not shown separately, to signal the approach to the completely lowered position to the control device 13 during lowering, said control device then again closing the said switching valve 17 and reducing the lowering movement of the dump body 2 by means of the flow control valve 18 to achieve a gentle approach to the end position.

If, at some point during the unloading mode, in particular during the raising of the dump body 2, a low braking pressure or steering pressure should occur, the control device 13 overrides the control routine of the unloading mode with so-to-say a higher priority control signal by which the switching valve 15 is closed and the second pump device 11 is correspondingly disconnected and is again put to its actual function of braking and steering. Only the first pump device 9 remains to continue to raise the dump body 2, which admittedly results in a lower hoisting speed, but leads, via the second pump device 11, to a safe operation of brakes and steering.

In travel operation, the valves 18 and 17 remain closed, whereby the hydraulic cylinders 22 and 23 are locked in their lowered positions. The possibility exists here of allowing the hydraulic cylinders 22 and 23 to move in completely and to support the dump body 2 by mechanical standing up or to keep the hydraulic cylinders 22 and 23 moved out a small amount, whereby the dump body 2 is so-to-say gently supported on a hydraulic cushion. The valve 15 is closed in this connection to disconnect the second pump device 11 and to use it solely for the steering 6 and the braking device 7.

If the dump body 2 is not actuated, in particular in travel operation, the first pump device 9, which is provided per se for the actuation of the dump body 2, can be connected via a further switching valve 26 to an auxiliary unit such as a cooling pump in order to be able also to utilize the pumping device 9 in travel operation.

On the unloading and moving out of the dump body 2, the movement of the dump body 2 is advantageously controlled via the further valve 25 which controls the outflow of the hydraulic fluid from the pressure chambers of the hydraulic cylinders 22 and 23 which become smaller on the raising of the dump body 2. This is in particular of advantage when the center of gravity of the dump body 2 and of the overburden stored therein moves over the tilt axis 21 so that an abrupt tilting back of the dump body 2 could occur. However, the valve 25 is coupled to the raising side of the hydraulic cylinders 22 and 23 via the control line 27 and demands a positive pressure on the raising side of the hydraulic cylinders 22 and 23 to permit the backflow of the hydraulic fluid. A resistance is optionally hereby built up which controls and/or prevents an unwanted moving out of the hydraulic cylinders 22 and 23.

The invention claimed is:

1. A dump truck, defining a large mining truck, comprising a dump body (2) for the transport of overburden, a first hydraulic circuit (8) having a first pump device (9) for the actuation of the dump body as well as a second hydraulic circuit (10) having a second pump device (11) for the actuation of a steering (6) and/or of a braking device (7) of a dump truck chassis (4), characterized in that the two hydraulic circuits (8, 10) are connected to one another by a valve device (12) which is controlled by a control device (13) such that, on one hand, the two hydraulic circuits (8, 10) work together in a discharge mode and actuate the dump body (2) together and, on another hand, the two hydraulic circuits (8, 10) work separately in a travel mode so that the second hydraulic circuit (10) is disconnected from the dump body (2) and an actuator device (14) thereof.

2. A dump truck according to claim 1, further comprising at least one further hydraulic circuit with at least one further pump device for actuation of at least one further truck component, wherein the at least three hydraulic circuits are connected to one another by said valve device (12) wherein said control device (13) is adapted to actuate the said valve device (12) such that in said discharge mode at least three hydraulic pumps work together to supply hydraulic pressure for a fast hoisting operation of the dump body (2) whereas in said travel mode at least one of said first, second and further pump devices is disconnected from the other pump devices to separately operate corresponding truck component connected to said at least one pump device.

3. A dump truck in accordance with claim 1, wherein, in the travel mode, the first hydraulic circuit (8) is connected by the valve device (12) to at least one auxiliary unit, which is disconnected from the first hydraulic circuit (8) in the discharge mode, so that the at least one auxiliary unit can be actuated by the first hydraulic circuit (8) and the first pump device (9).

4. A dump truck in accordance with claim 1, wherein at least one further hydraulic circuit having a further pump device for the actuation of a further hydraulic unit is provided, with the further hydraulic circuit being able to be connected to the first and/or the second hydraulic circuit (8, 10) by the valve device (12) such that the first the hydraulic circuit together with the second and/or the further hydraulic circuit are provided for the actuation of the dump body (2) in the discharge mode.

5. A dump truck in accordance with claim 1, wherein the valve device (12) includes at least one switching valve (15) and one flow control valve (18).

6. A dump truck in accordance with the claim 5, wherein the second hydraulic circuit (10) can be connected to the first hydraulic circuit (8) via a first switching valve (15) upstream of the flow control valve (18) such that, in the discharging mode, pressure fluid is guided through the flow control valve (18) both from the first pump device (9) and from the second pump device (11).

7. A dump truck in accordance with claim 5, wherein a second switching valve (16) is connected parallel to the flow control valve (18) and is controlled by the control device (13) such that, on a demand for a high positional speed for the dump body (2), the second switching valve (16) is opened and, on a demand for a low positional speed for the dump body (2), the second switching valve (16) is closed.

8. A dump truck in accordance with claim 5, wherein the at least one flow control valve (18) and the at least one switching valve (15) of the valve device (12) are controlled in different manners by the control device (13) in the discharging mode to achieve different speeds.

9. A dump truck in accordance with claim 1, wherein at least one of the pump devices (9, 11) has a variable delivery pump with an adjustable pump flow, with the pump flow of the variable delivery pump being controlled by the control device (13).

10. A dump truck in accordance with claim 4, wherein, at least one of the pump devices (9, 11) has a variable delivery pump with an adjustable pump flow, with the pump flow of the variable delivery pump being controlled by the control device (13), and in the discharge mode, the control device (13) adjusts positional speed of the dump body (2) via a control path by changing the position of at least one flow control valve (18) and/or of at least one switching valve (15, 16, 17) of the valve device (12) and changing the pump flow of the variable delivery pump.

11. A dump truck in accordance with claim 1, wherein the first pump device (9) and the second pump device (11) and any further pump device are configured as separate pumps.

12. A dump truck in accordance with claim 1, wherein the first pump device (9) and the second pump device (11) are formed by a double pump.

13. A dump truck in accordance with claim 1, wherein the control device (13) has a safety switch which, on detection of circumstances relevant to safety, suppresses connecting together of the hydraulic circuits (8, 10) and/or also disconnects the second hydraulic circuit (10) and/or any further hydraulic circuit from the dump body (2) and its actuator device (14) in the discharge mode.

14. A dump truck in accordance with claim 13, wherein the safety switch is connected to pressure detection means for the detection of a steering pressure and/or a brake device pressure and, on a fall in the steering pressure and/or brake device pressure below a predetermined threshold, suppresses connecting together of the hydraulic circuits (8, 10) and/or also disconnects the second hydraulic circuit (10) from the dump body (2) and its actuator device (14) in the discharge mode.

15. A dump truck in accordance with claim 1, wherein a pressure storage (19) is associated with the second hydraulic circuit (10) and the steering (6) and/or the brake device (7) can be pressurized by means of it in the discharge mode despite connection of the second pump device (11) to the dump body (2) or to its actuator device (14).

16. A dump truck in accordance with claim 2, wherein, in the travel mode, the first hydraulic circuit (8) is connected by the valve device (12) to at least one auxiliary unit, which is disconnected from the first hydraulic circuit (8) in the discharge mode, so that the at least one auxiliary unit can be actuated by the first hydraulic circuit (8) and the first pump device (9).

17. A dump truck in accordance with claim 2, wherein the valve device (12) includes at least one switching valve (15) and one flow control valve (18).

18. A dump truck in accordance with claim 3, wherein the valve device (12) includes at least one switching valve (15) and one flow control valve (18).

19. A dump truck in accordance with claim 4, wherein the valve device (12) includes at least one switching valve (15) and one flow control valve (18).

20. A dump truck in accordance with claim 16, wherein the valve device (12) includes at least one switching valve (15) and one flow control valve (18).

* * * * *